United States Patent [19]

Albee, Jr. et al.

[11] 4,412,040

[45] Oct. 25, 1983

[54] LOW MOLECULAR WEIGHT COPOLYMER SALTS AS LUBRICANTS IN PLASTICS

[75] Inventors: Paul J. Albee, Jr., Bensalem, Pa.; Patricia E. Burdick, Lake Hiawatha; Joseph I. Wrozina, Tenafly, both of N.J.

[73] Assignee: Allied Corporation, Morris Township, Morris County, N.J.

[21] Appl. No.: 222,197

[22] Filed: Jan. 2, 1981

[51] Int. Cl.$^3$ .............................................. C08L 33/02
[52] U.S. Cl. .................................... 525/143; 525/176; 525/183; 525/221
[58] Field of Search ............... 525/329, 369, 221, 143, 525/176, 183; 260/31.2 R; 252/56 R; 524/397

[56] References Cited

U.S. PATENT DOCUMENTS

| | | | |
|---|---|---|---|
| 3,264,272 | 8/1966 | Rees | 260/78.5 |
| 3,347,957 | 10/1967 | Adomaltis et al. | 260/897 |
| 3,365,520 | 1/1968 | Foster | 525/221 |
| 3,410,928 | 11/1968 | Baum | 525/221 |
| 3,437,718 | 4/1969 | Rees et al. | 260/889 |
| 3,492,367 | 1/1970 | Starkweather | 525/183 |
| 3,923,720 | 12/1975 | Coaker et al. | 260/31.2 R |
| 4,283,314 | 8/1981 | Zeilstra et al. | 260/31.2 R |

*Primary Examiner*—Paul R. Michl
*Attorney, Agent, or Firm*—Richard A. Negin

[57] ABSTRACT

A polymer lubricant comprising a copolymer salt of a low molecular weight copolymer acid of an alpha-olefin and an alpha,beta-ethylenically unsaturated carboxylic acid, a composition containing the lubricant, and a method for processing polymers containing the lubricant.

43 Claims, 3 Drawing Figures

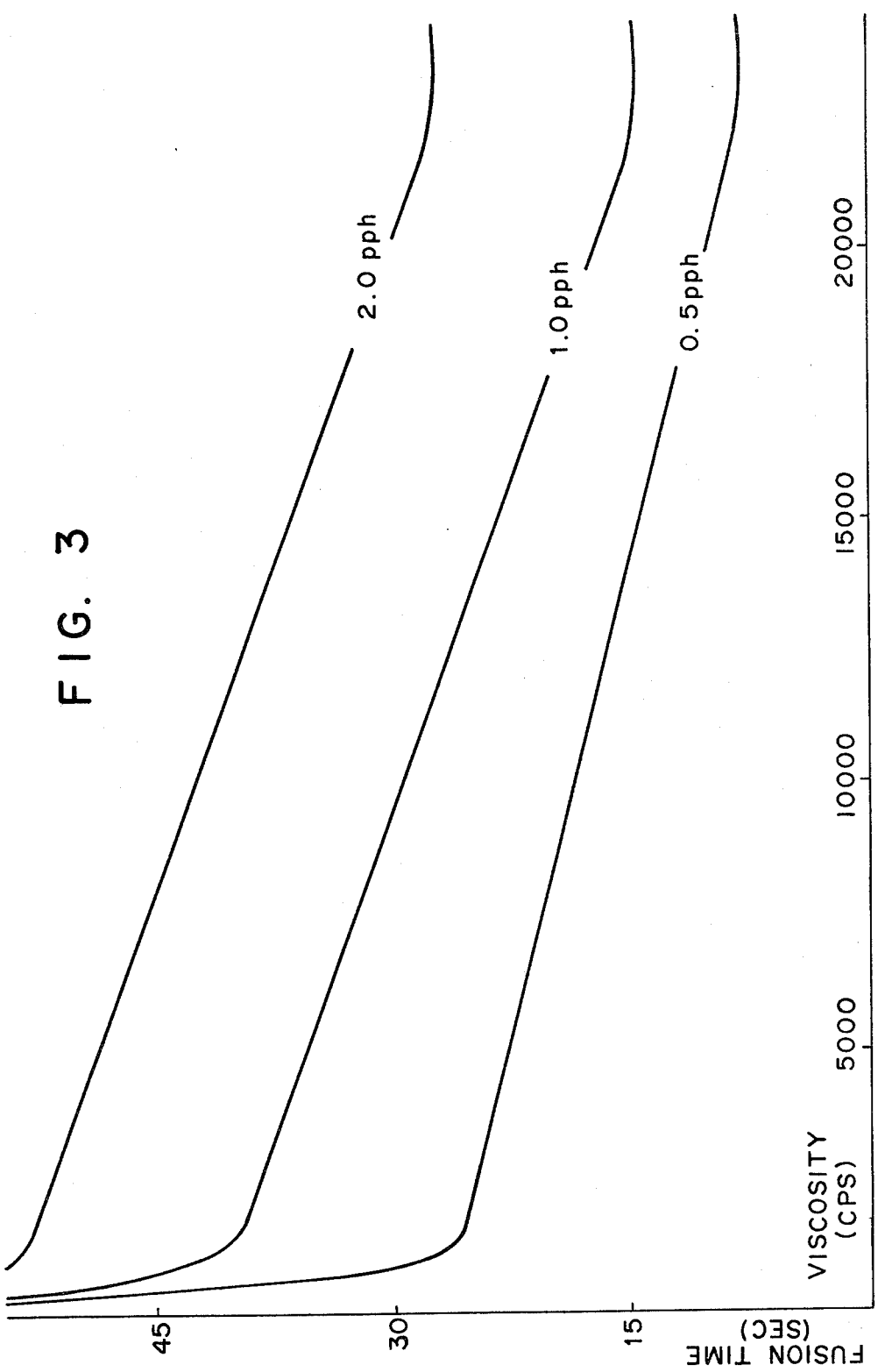

LOW MOLECULAR WEIGHT COPOLYMER SALTS AS LUBRICANTS IN PLASTICS

DESCRIPTION

BACKGROUND OF THE INVENTION

This invention relates to lubricants for polymers; more particularly this invention relates to lubricants for polymers made from polymer salts of low molecular weight, copolymers of alpha olefins and alpha, beta-ethylenically unsaturated carboxylic acid.

Lubricants are added to polymers to decrease melt sticking of the polymer, to improve the flow properties, and make it easier to process the polymers. Lubricants generally work to reduce the melt viscosity of the polymer at the processing temperature and/or to reduce the friction between the polymer and metal surfaces of processing machinery.

The state-of-the-art of polymer lubricants is reviewed in Modern Plastics Encyclopedia, 1979–1980, pages 198–202, at page 675.

Lubricants for polymers which are known in the art include: paraffin wax; polyethylene waxes; calcium stearate; stearate esters, alcohols, and acids; montan-based esters, acids, and salts; stearate salts; and amide waxes.

Lubricants can act internally or externally depending on their compatibility with the polymer. Generally the lubricant has a lower melting temperature than the polymer which it is lubricating. An external acting lubricant does not blend well with the polymer and maintains its separate integrity. The external lubricant melts and reduces polymer to metal friction which can cause stickiness between the process machine and polymer.

Internal and external lubrication characteristics are influenced by the degree of compatibility between the lubricant and the polymer. Compatibility by definition is the ability of two or more constituents to mix and remain homogeneously dispersed in one another. Physical compatibility depends on process conditions and physical properties of the lubricant and polymer. Physical properties considered are hardness and viscosity. Chemical compatibility is based upon chemical structure and interaction of the constituents such as the degree of solubility between the melted lubricant and polymer melt.

The more compatibility between a lubricant and the polymer, whether it is chemical or physical, the more internally the lubricant functions. An internal acting lubricant does not only act at the surface of the polymer, lubricating as it is processed. The lubrication occurs inside the polymer melt as well. The lubricant, if an efficient solvent, forms a continuous solvating layer of molecules around the chain segments of the polymer, decreasing the amount of chain-to-chain contact as well as the chain-to-metal contact on the surface. The internal lubricant intermingles with the polymer melt and forms an intimate matrix. An internal acting lubricant blends into the body of the polymer and affects the flow properties of the polymer. The internal lubricant reduces the polymer-to-polymer friction which would reduce power consumption necessary during processing.

The external function of the lubricant is determined by the incompatibility between the lubricant and the molecule. The more incompatible the lubricant and the polymer are, the more the lubricant acts at the surface of the polymer melt easing the polymer's way through the machinery, such as an extruder. The external lubricant decreases the friction between a metal surface and the polymer.

The amount of lubricant external to the polymer is critical when the polymer is processed. Too much lubricant causes slippage, eliminating the friction necessary for the movement of polymer through the barrel of an extruder. This results in a decrease in output and torque. Polymers are more sensitive to external over-lubrication than to internal over-lubrication. Therefore, the concentration of external lubricants is generally much lower than that of internal lubricants.

It is known in the art to use ionic copolymer additives in various polymers to improve properties. The ionic copolymers disclosed in the art are made from copolymers of alpha-olefins and alpha,beta-ethylenically unsaturated carboxylic acid. However, these copolymers are generally of higher molecular weights and are used to improve polymer properties unrelated to processing, such as impact resistance. Examples of these are U.S. Pat. No. 3,264,272 and U.S. Pat. Nos. 3,404,134, 3,347,957 and 4,210,579. The high molecular weight of the copolymer acids used to make the ionic copolymers are reflected by the fact that these higher molecular weight copolymers have measurable melt indexes, and that they can be processed by milling.

SUMMARY OF THE INVENTION

In accordance with this invention, a polymer lubricant has been found which comprises a copolymer salt of a low molecular weight copolymer acid of an alpha-olefin and an alpha,beta-ethylenically unsaturated carboxylic acid. The copolymer acid has a molecular weight from about 500 to about 20,000, preferably 1,000 to 6,000. The copolymer acid is neutralized up to about 100%, and preferably from 15% to 60%, with at least one cation from the group consisting of metal cations from Groups IA, IIA, IIB, IIIA and the transition elements of the Periodic Table of Elements, with Group IIA and IIB metals preferred. The lubricant of the present invention is useful in a method to process polymers.

Preferably, the polymer lubricant can be made of a salt of a copolymer acid of ethylene and an alpha,beta-ethylenically unsaturated carboxylic acid having 3 to 6 carbon atoms such as acrylic acid. The ethylene and acrylic acid copolymer preferably has an acid number between about 40 and 160. The acid number is measured by milligrams of potassium hydroxide necessary to neutralize one gram of the polymer acid.

The lubricant of the present invention can be used with a variety of polymers. Two particular polymers exemplifying the fact that the lubricant of the present invention can be used with diverse polymers are polyolefins, such as polypropylene, and polymers of the styrene family, such as polystyrene.

Further objects, features and advantages of the present invention will become apparent by reference to the following figures and specification.

BRIEF DESCRIPTION OF THE FIGURES

FIG. 3 is a graph of Fusion Time (sec) v. viscosity (centipoises (cps)) for blends of high impact polystyrene containing varying amounts of copolymer salt lubricants of the present invention.

DETAILED DESCRIPTION OF THE INVENTION

Figure 1:
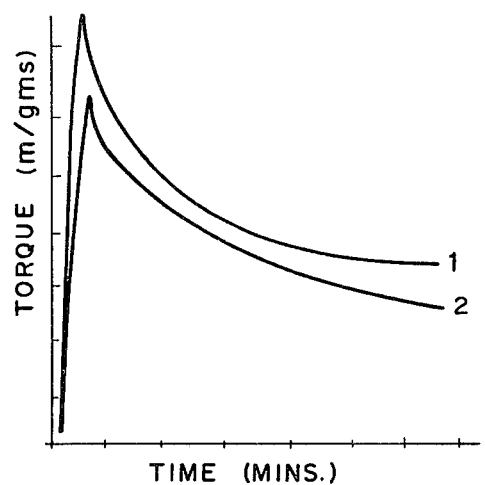
FIGS. 1 and 2 are graphs of Torque v. Time for blends mixed in a Brabender Mixing Bowl.

The present invention is a lubricant for polymers. The lubricant is based on a low molecular weight copolymer acid. The copolymer acid is a copolymer of an alpha-olefin and an alpha,beta-ethylenically unsaturated carboxylic acid. The alpha,beta-ethylenically unsaturated carboxylic acid can be a monocarboxylic acid, or have more than one carboxylic group attached to it. The molecular weight of the copolymer acid is from about 500 to about 20,000, preferably from about 1,000 to 15,000, more preferably from about 1,000 to about 6,000, and most preferably from about 1,000 to about 3,500. The lubricant is a salt of the copolymer acid. The acid is neutralized with at least one cation from the group consisting of metallic cations having a valence of 1 to 3.

The alpha,beta-ethylenically unsaturated carboxylic acids which can be copolymerized with the alpha-olefin preferably have 3 to 8 carbon atoms. Examples of such acids include acrylic acid, methacrylic acid, ethacrylic acid, itaconic acid, maleic acid, fumaric acid and monoesters of other dicarboxylic acids, such as methyl hydrogen maleate, methyl hydrogen fumarate, ethyl hydrogen fumarate, and maleic anhydride, which is considered to behave like an acid and be an acid in the present invention.

The alpha-olefin is preferably ethylene. The concentration of the ethylene in the copolymer is at least 50 mol percent, and preferably above 80 mol percent.

A preferred copolymer acid is a copolymer of ethylene and an alpha,beta-ethylenically unsaturated monocarboxylic acid having 3 to 6 carbon atoms. A most preferred alpha,beta-ethylenically unsaturated monocarboxylic acid is acrylic acid. The ethylene acrylic acid copolymer has an acid number in the range from about 1 to about 180, with an acid number from about 40 to 160 being preferred, and an acid number from about 40 to 120 being most preferred. The acid number is determined by the number of milligrams of potassium hydroxide per gram of acid. The molecular weight is from about 500 to about 20,000, preferably from about 1,000 to 15,000, more preferably from 1,000 to 6,000, and most preferably from 1,000 to 3,500. Table I below characterizes preferred ethylene acrylic acid copolymers.

tions of our vapor phase polymerization the ratios by weight of the monomers in the feed and in the product are desirably substantially constant and variance in ratio between feed and product at most only minor such that products obtained by the invention contain a major portion of ethylene and generally 0.8% to 35% by weight of the comonomer, preferably 2.0% to 20% by weight of the comonomer with optimum portions depending largely on the particularly comonomer and intended use of the copolymer product. Generally, having less than a major portion of ethylene in the feed increasingly tends to produce products of undesirable softness. Having less than about 1% ethylene in the monomer tends to make it increasingly difficult to insure production of homogeneous polymers although one advantage of the invention is that homogeneous polymers may be produced with 15% or even somewhat less ethylene in the feed. It will be evident that advantageous feature of our process is the ability to maintain ratios of comonomer in the product to comonomer in the feed within the range of 0.7:1 to 1.8:1 which represent ratios substantially different than those commonly encountered in previously proposed processes with comonomers such as acrylic acid. The copolymers produced by the invention are of low molecular weight ranging generally between about 500 to 5,000 number average molecular weight, preferably between 1,000 to 3,000 number average molecular weight, as measured by a vapor pressure osmometer. The copolymers also desirably have viscosity not exceeding about 1500 centipoises at 140° C., preferably between 100 to 1200 centipoises at 140° C. A variety of new and useful copolymers are provided by the present invention. Of special interest are the homogeneous copolymers of ethylene and acrylic or methacrylic acid containing 1% to 20% by weight acrylic acid or methacrylic acid in the copolymer, preferably 3.5% to 12%, and further characterized by a number average molecular weight between 500 to 5000, preferably 1500 to 4000, acid number between 10 to 200, preferably 20 to 130, and hardness (0.1 mm, penetration) between 0.5 to 30, preferably 1 to 10 when tested at room temperature (77° F.) with an ASTM needle with a load of 100 grams for 5 seconds."

TABLE I

| Copolymer Acid | Softening Pt. (ASTM E-28) °C. | Softening Pt. (ASTM E-28) °F. | Hardness dmm (ASTM D-5) | Density g/cc (ASTM D-1505) | Brookfield Viscosity @ 140° C. cps | Acid No. mg KOH/g | Wt. % Acrylic Acid |
|---|---|---|---|---|---|---|---|
| A | 108 | 226 | 2.0 | 0.93 | 500 | 40 | 5 |
| B | 102 | 215 | 4.0 | 0.93 | 650 | 80 | 8 |
| C | 92 | 198 | 11.5 | 0.93 | 650 | 120 | 15 |

The low molecular copolymer acids used to make the copolymer salts of the present invention can be prepared by any suitable process known in the art. An example method is described in U.S. Pat. No. 3,658,741, which is incorporated herein by reference.

Of particular interest in U.S. Pat. No. 3,658,741 is the passage beginning at column 7, line 36 through column 8, line 6:

"The ethylene desirably constitutes at least 65% by weight of the monomer feed and the comonomer from 1.0% to 35% of the feed, preferably 2 to 20% by weight of the feed. Under the specific condi- Cations having valences of 1 to 3 can be used to neutralize the copolymer acid. Preferably, metallic cations are derived from a group of metals which can be chosen from Groups IA, IIA, IIIA and the transition elements of the Periodic Table of Elements to be used in this process. Metal cations which are preferred are sodium, potassium, magnesium, calcium, barium, zinc and aluminum cations, with calcium cations being most preferred. Cation containing materials can be metal salts including: oxides, hydroxides, acetates, methoxides, oxylates, nitrates, carbonates and bicarbonates. Metallic salt containing materials which are illustrated in the examples discussed below include calcium hydroxide, calcium acetate, magnesium oxide and zinc acetate. The copolymer acid can be neutralized up to 100%; however, it is preferred to neutralize the copolymer acid to from 15 to 60 percent, and more preferably from 25 to 50 percent neutralization of the carboxylic acid groups using the process of the present invention.

The most preferred lubricant is copolymer acid A of Table I neutralized to between about 15 and about 60 percent with a calcium cation. A preferred cation containing material is calcium hydroxide. This copolymer salt has a high enough viscosity in various polymer melts to internally lubricate. However, the viscosity is low enough to provide a desirable amount of external lubrication. Additionally, because of the lower acid number of copolymer acid A, the viscosity of the copolymer salt is not as sensitive to the amount of calcium hydroxide during neutralization, thereby making control of the process easier. Finally, a lower viscosity salt of copolymer acid A is easier to produce and handle. As will be apparent from the discussion to follow, the copolymer salts of other copolymer acids, such as copolymer acids B and C, can be used if a more internal acting lubricant is desirable and/or if there is a need to add greater concentrations of the lubricant.

The lubricant of the present invention can be used with a wide variety of diverse polymers. The polymers can be polyolefins, such as polypropylene, or styrene based polymers, such as polystyrene. The lubricants of the present invention can also be used with polymers which include polyamides, polyesters, polyvinyl chloride, ABS (copolymers of acrylonitrile, butadiene and styrene), polyethylene, polypropylene, other polyolefins and polycarbonates, polyethylene terephthalate, polybutylene terephthalate, and phenolic resins. Polymer compositions can include up to about 10 parts, preferably up to 5 parts and most preferably from 1.0 to 3.5 parts, of the lubricant per hundred parts of the polymer of the present invention.

The polymer salt lubricants of the present invention can be made by any means to make low molecular weight copolymer acid ionic salts known in the art. It is preferred to prepare the polymer salts of the present invention by the method described in the copending patent application entitled "Preparation of Low Molecular Weight Copolymer Salts", Ser. No. 220,872, filed Dec. 29, 1980, incorporated herein by reference. In summary, the copolymer acid and the cation containing material are fed to a reaction vessel. During the reaction, the reaction vessel is maintained below atmospheric pressure for at least a portion of the time, so that the oxygen content of the reaction vessel is minimized and volatile reaction products are removed. The reacting mixture is continually stirred or mixed within the reaction vessel. The temperature within the reaction vessel is controlled and maintained above the melting point of the polymer.

The lubricants of the present invention behave both internally and externally. They exhibit excellent thermal stability and can be used in a wide variety of diverse polymers as noted above. The internal lubrication of diverse polymers, such as olefins and styrenic polymers, is related to the compatibility of the lubricant and the polymer to be lubricated. Physical properties to consider in choosing a lubricant are its viscosity and hardness which are related to molecular weight. Chemical compatibility is also important. The chemical compatibility is based upon chemical structure and interaction of constituents, such as the degree of solubility between the melted lubricant and polymer melt. The more compatible the lubricant and the polymer to be lubricated are, the more internally the lubricant behaves.

In addition to compatibility, the melting point of the lubricant, particularly an internally acting lubricant, is also an important consideration. When the melting point of the lubricant and polymer to be lubricated are comparable, the melted lubricant can behave internally in the polymer melt, reducing torque while maintaining or decreasing the processing time. FIG. 1 shows a schematic curve of torque versus processing time. These curves are typical for a Brabender Mixing Bowl. Curve 1 is for a polymer containing no lubricant. The torque increases to a peak which occurs upon the melting of the polymer. Curve 2 is for the same polymer containing a lubricant which behaves internally and has a comparable melting point. The amount of torque necessary to process a given amount of polymer in a given time is decreased by the use of the internal lubricant.

Figure 2:
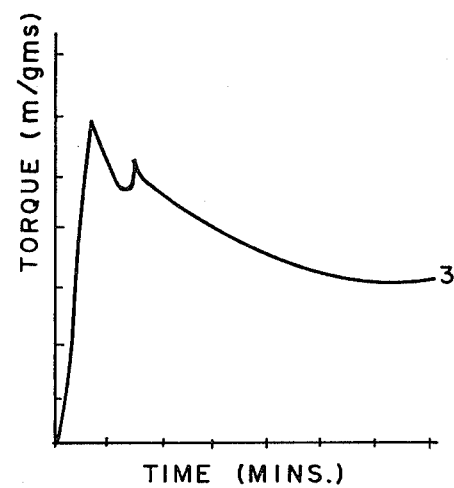

If the melting point of the lubricant is too far below that of the polymer to be lubricated, it melts before the polymer has even softened. This causes the lubricant to over-lubricate the polymer. In an extruder, such over-lubrication occurs in the feed and transition zone of the extruder. This is illustrated by FIG. 2 which schematically shows a curve of torque versus processing time. The time between the two peaks of the curve is the time during which the lubricant is melted and over-lubricating the unmelted polymer. The second peak along the time axis is when the polymer melts and the over-lubrication condition ceases. Similarly, if the melting point of the lubricant is too high, the polymer melts first and over-lubricates the lubricant resulting in a drop in torque until both are melted. The over-lubrication period between the peaks of curve 3 of FIG. 2 is called the fusion time. This is the time necessary for melting of both the polymer and lubricant to take place. During this time, the system is overlubricated. Although the torque decreases, no processing is taking place and valuable machine time is lost. At this time, the polymer blend is exposed to the high temperature in the processing equipment.

It is desirable to select a lubricant for a polymer which results in a minimum of fusion time. The fusion time can be considered an indication of the degree of internal lubrication of a given copolymer salt lubricant, and the amount of that lubricant which can be used before unacceptable external lubrication occurs.

It has been found that the viscosity of the copolymer salt lubricant is an important indication of its behavior as a lubricant. Varying lubricant viscosity can compensate for differences in polymer and lubricant melting points. FIG. 3 represents plots of fusion time, measured on a Brabender Mixing Bowl at 60 rpm and 190° C. for a 50 g charge, of a lubricated high impact polystyrene HIPS USS 610, manfactured by USS Chemicals Division of U.S. Steel Corporation, Pittsburgh, Pa. versus the viscosity of a copolymer salt of ethylene acrylic acid polymers neutralized with calcium hydroxide. The viscosities are Brookfield viscosities measured at 140° C. A fusion time of 45 seconds or more indicates that over-lubrication would occur in an extruder using this polymer. Referring to this graph, it is seen that satisfactory lubrication can occur using an ethylene acrylic acid calcium salt in a concentration range of about 0.5 parts per hundred (pph) in the polymer of the lubricant having a viscosity of about 800 cps to about 3.5 pph lubricant having a viscosity of about 25,000 cps. It has been found that higher viscosity lubricants up to about 50,000 cps can be used as lubricants of the present invention, so that amounts greater than 3.5 pph can be used.

When the viscosity of the lubricant is below about 800 cps, the polymer's tolerance level is very low. The lubricant does not behave internally, based on viscosity. Only a limited amount of lubricant could be used without over-lubrication occurring. The exception to this would be a lubricant that is chemically compatible to the polymer. A chemically compatible lubricant of this low viscosity performs an internal function depending upon the degree of compatibility. Therefore, below 800 cps the viscosity and chemical compatibility are both factors in the function of a lubricant. If a lubricant's viscosity was in this range and no outstanding chemical compatibility existed between the polymer and lubricant, the lubricant will probably function externally.

The area between about 800 and about 8,000 cps is an area where hardness, chemical structure, and viscosity are key factors which influence the performance. A very hard material is expected to behave internally even at the low end of the viscosity range.

Above 8,000 cps, the viscosity is the main parameter affecting lubricant behavior. The high viscosity overshadows all other properties and takes predominance. A lubricant in this viscosity range functions internally at the levels indicated on the graph.

The lubricants of the present invention can be used in a wide variety of polymers. As noted, polystyrene is a difficult polymer to lubricate. Polystyrene is presently lubricated with externally acting lubricants, such as zinc stearate. The amount of zinc stearate is limited to about 0.5 parts per hundred polystyrene before over-lubrication occurs. The lubricants of the present invention have a lower fusion time than zinc stearate when used in polystyrene at the 1.0 parts per hundred polystyrene level.

The above lubricants are useful in methods of processing polymers in various forming operations, such as molding and extrusion, or in mixing operations including mill mixing, extruder mixing and internal mixing, such as in a Banbury mixer.

The polymer to be processed and the lubricant of the present invention are preferably preblended. The preblending can be a mere physical mixing of polymer pellets and lubricant in powder or pellet form. This blend is fed to a processing means, which can include molding equipment, an extruder, mills, a mixing extruder or an internal mixer. Alternatively, and depending on the processing means, the polymer and lubricant can be fed separately to the processing means.

The polymer is processed with the aid of the lubricant. The lubricant of the present invention can be used to process polymers at temperatures from above the polymer melt temperature to about 400° C. The formed or mixed polymer product is then collected.

The examples set forth below illustrate the nature of the invention and the manner of carrying it out. However, the invention should not be considered as being limited to the details thereof.

EXAMPLES 1–2

An initial run summarized by Examples 1 and 2 below illustrates the use of low molecular weight ethylene acrylic acid copolymer salts formed upon reaction of ethylene acrylic acid copolymer with calcium hydroxide, as a lubricant for high impact polystyrene. Ethylene acrylic acid copolymer C of Table I was reacted with 4 weight percent calcium hydroxide in a single blade mixing bowl at 395° F. and 40 rpm for 20 minutes. Theoretically, 50 percent of the acid groups are neutralized in the 4 percent calcium hydroxide and copolymer C mixture.

The 4 percent calcium hydroxide copolymer C acid salt was blended into USS 610 TM high impact polystyrene (manufactured by USS Chemicals Division, U.S. Steel Corporation, Pittsburgh, Pa.) in a Henschel blender for 2 minutes. The blends were extruded through a 1¼ inch Brabender extruder. The temperature profile in the extruder was: Zone 1—180° C., Zone 2—190° C., Zone 3—200° C., Zone 4—200° C. and Zone 5—200° C. The USS 610 high impact polystyrene has a Vicat Softening Point of 240° F. (96° C.) on ASTM D-1525.

Table II summarizes the effect on output in grams per hour of the various lubricants. A control was run which had no lubricant. lubricant was used in concentrations of 0.1, 0.5 and 1.0 parts per hundred (pph) of polystyrene. Comparatives A and B show the effect on the output of high impact polystyrene USS 610 using unneutralized ethylene acrylic acid copolymer B of Table I as a lubricant in polystyrene. Comparatives C and D illustrate the use of a polyethylene homopolymer as a lubricant in polystyrene USS 610. The polyethylene homopolymer is characterized by: a softening point of about 106° C. (ASTM E-C8), a penetration hardness of about 4.0 dmm (ASTM D-5); and a Brookfield viscosity at 140° C. of about 350 cps. Examples 1 and 2 illustrate the use of 50 percent neutralized ethylene acrylic acid copolymer C with Ca(OH)$_2$ at a 4 percent level to lubricate high impact polystyrene USS 610.

TABLE II

|  | Extruder RPM | OUTPUT gm/hour | | | |
| --- | --- | --- | --- | --- | --- |
|  |  | Control 0 pph | .1 pph | .5 pph | 1.0 pph |
| Comparative A | 15 | 1518 | 1539 | 846 | * |
| Comparative B | 30 | 3186 | 3228 | 1071 | * |
| Comparative C | 15 | 1518 | 726 | * | * |
| Comparative D | 30 | 1386 | * | * | * |
| Example 1 | 15 | 1518 | 1617 | 1599 | 1584 |
| Example 2 | 30 | 1386 | 3270 | 3273 | 3333 |

*over-lubrication occurred

Over-lubrication is a condition which occurs when there is too much lubrication resulting in insufficient friction to cause the polymer to move through the extruder. This causes the output to decrease in comparison to when no lubricant is used. Referring to Table II, the unneutralized ethylene acrylic acid copolymer, Comparatives A and B, started to over-lubricate at 0.5 parts per hundred resin, and the homopolymer, Comparatives C and D, started to over-lubricate at 0.1 parts per hundred polystyrene resin. This indicates that these lubricants are acting externally in forming a lubrication layer between the polystyrene and the metal surfaces of the extruder. Examples 1 and 2 resulted in no over-lubrication occurring through 1 part per hundred styrene resin; and in fact, the output increased with the addition of the lubricant indicating internal lubrication.

EXAMPLES 3 and 4

Comparatives E through H and Examples 3 and 4 illustrate that the lubricant of the present invention can be used in a variety of different polymers. In Examples 3 and 4, 50 percent neutralized acid copolymer C of Table I was evaluated in Pro-Fax TM resin 6501, polypropylene, a homopolymer having a melt index of 3.4, which is manufactured by Hercules Inc. of Wilmington, Del. The 50 percent neutralized copolymer acid C of Table I was prepared in the same manner as Examples 1 and 2. Comparatives E and F disclose results using an unneutralized ethylene acrylic acid copolymer B of Table I. Comparatives G and H disclose results using a polyethylene homopolymer having an ASTM E-28 softening point of 215° F. (102° C.), an ASTM D-5 hardness of 7.0 dmm, and a Brookfield viscosity at 140° C. (284° F.) of 180 centipoises. The lubricants were blended with the polypropylene in a Henschel blender for 2 minutes at the concentrations of 0, 0.1, 0.5, 1.0, 2.0 and 2.5 parts per hundred of the polypropylene. These blends were then extruded on a 1¼ Brabender extruder. The temperature profile for the polypropylene resin was as follows: Zone 1—190° C., Zone 2—200° C., Zone 3—210° C., Zone 4—220° C. and Zone 5—220° C. The output in grams per hour is summarized in Table III below:

TABLE III

| | Ex-truder RPM | OUTPUT gm/hour | | | | | |
|---|---|---|---|---|---|---|---|
| | | Control 0 pph | .1 pph | .5 pph | 1.0 pph | 2.0 pph | 2.5 pph |
| Comparative E | 10 | 1035 | 900 | 1014 | 939 | 495 | — |
| Comparative F | 30 | 2988 | 2979 | 3009 | 2910 | * | — |
| Comparative G | 10 | 972 | 894 | 984 | 969 | 990 | — |
| Comparative H | 30 | 2709 | 3087 | 3060 | 3102 | 3060 | — |
| Example 3 | 15 | 1452 | 1500 | 1488 | 1479 | — | 1392 |
| Example 4 | 30 | 2877 | 2700 | 2934 | 2838 | — | 2859 |

*over-lubrication occurred

A review of Table III shows that the lubricants of Comparatives E through H, as well as the lubricant of the present invention, can be used with polypropylene. However, unneutralized copolymer B (Comparatives E and F) over-lubricates at 2 parts per hundred. Examples 3 and 4 show that the lubricant of the present invention is a satisfactory lubricant for polypropylene without over-lubrication at 2.5 pph.

Polyethylene homopolymers, such as those used in Comparatives C, D, G and H, are unsatisfactory lubricants for styrene-type polymers. Unneutralized copolymer acids, such as those in Comparatives A, B, E and F, are poor lubricants for styrene-type polymers and limited as to their concentration in polypropylene. Examples 1 through 4 show that the lubricants of the present invention can be used in polyolefins, such as polypropylene, as well as styrene-type polymers, such as polystyrene, and obtain internal-type lubrication where larger amounts of lubricant can be incorporated without over-lubrication.

As discussed above, the behavior of a lubricant can be internal or external. A lubricant functions internally if it has compatible physical properties such as softening point, viscosity, hardness, and/or chemical compatibility which depends on the existence of solubility between the lubricant and the base polymer.

EXAMPLES 5–10

Table IV below summarizes the materials used to further evaluate the present invention. Copolymer acid salts in test materials of Examples 5–10 were prepared in accordance with the method described in companion application entitled "Preparation of Low Molecular Weight Copolymer Salts", referenced above. Briefly, this method encompasses a process in which a copolymer acid and a cation containing material are fed into a reaction vessel. Calcium hydroxide was used as a cation containing material. Sufficient calcium hydroxide was used to neutralize about 25 percent and about 50 percent of the carboxylic groups of the salts of the acrylic acid copolymers.

The reaction was conducted in the laboratory using a glass reaction vessel. The reaction vessel was held within a heating mantle, connected to a variac, electric heat source. A laboratory vacuum line at about 30 mm Hg was connected to the glass reaction vessel and the entire reaction took place under a vacuum. The negative pressure pulled off volatiles and also hindered any discoloration due to oxidation. A glass stirrer kept the copolymer salt that formed and the copolymer agitated during the reaction and aided dispersion. This eliminated an overabundance of gels due to poor dispersion in the reaction mass.

The temperature was controlled to about 250° C. The reaction was allowed to continue at this temperature until completion or until no more volatiles came from the reaction mass within the reaction vessel. Generally, the reaction took on the order of about 3 hours.

TABLE IV

| Test Material | Co-polymer Acid | Acid No. | % Neutralized | Brookfield Viscosity @ 140° C. cps | Hardness Shore A2/ Shore D |
|---|---|---|---|---|---|
| Control A | A | 40 | — | 627 | 75.2/29.0 |
| Example 5 | A | 40 | 25 | 1,610 | 95.0/44.0 |
| Example 6 | A | 40 | 50 | 5,500 | >100.0/49.6 |
| Control B | B | 75 | — | 660 | 81.0/21.0 |
| Example 7 | B | 75 | 25 | 3,875 | 84.0/34.0 |
| Example 8 | B | 75 | 50 | 24,625 | 95.0/39.0 |
| Control C | C | 120 | — | 695 | 62.0/11.1 |
| Example 9 | C | 120 | 25 | 9,550 | 71.0/19.5 |
| Example 10 | C | 120 | 50 | 34,125 | 89.0/29.5 |

The materials prepared and described in Table IV were made on a laboratory apparatus. Example 10 was difficult to mix and had very poor dispersion. The increase of viscosity for Example 10 made it unmanageable in the reaction apparatus and mixing almost impossible. It is believed that these materials can be made in appropriate apparatus.

It has been found that the material of Example 8, 50% neutralized copolymer acid B, had viscosity ranging from 35,000 to 45,000 cps when using the process of the referenced application. Briefly, the reaction was conducted in a three liter reaction vessel with continual stirring. The vessel was charged with 1,350 grams of copolymer acid B and 2.38% based on the weight of the copolymer of Ca(OH)$_2$. The Ca(OH)$_2$ was present in an amount sufficient to neutralize 48% of the copolymer acid carboxylic acid groups. The reaction proceeded for three hours. During the first two hours the temperature was raised to 200° C., at approximately a constant rate. The temperature was held at 200° C. for one additional hour.

The reaction was conducted under a nitrogen atmosphere at one atmosphere pressure. At the end of two hours, while the temperature was held at 200° C., a vacuum pressure of about 25 inches of mercury was applied for 15 minutes. Nitrogen at one atmosphere pressure was admitted to the vessel for the remaining 45 minutes. The nitrogen was used to help sweep the volatiles away.

EXAMPLES 11-16

Table V below illustrates comparatives and examples using various lubricants of Table IV in high impact polystyrene (USS 610). The high impact polystyrene plus lubricants were evaluated in a 1¼ inch Brabender extruder. The temperature zones were set at 170° C., 180° C., 190° C., 200° C., and 200° C.

TABLE V

|  | Lubr. Mat'l | Lubr. Brookfield Viscosity @ 140° C. cps | Extr. rpm | Pph in Polystyrene | Output gram/ 2 min |
|---|---|---|---|---|---|
| Comparative I | — | — | 15 | 0 | 47.9 |
| Comparative J | — | — | 30 | 0 | 106.9 |
| Example 11 | Ex 6 | 5,500 | 15 | 1 | 34.7 |
| Example 12 | Ex 6 | 5,500 | 30 | 1 | 106.7 |
| Example 13 | Ex 8 | 24,625 | 15 | 1 | 45.5 |
| Example 14 | Ex 8 | 24,625 | 30 | 1 | 106.7 |
| Example 15 | Ex 10 | 34,125 | 15 | 1 | 51.4 |
| Example 16 | Ex 10 | 34,125 | 30 | 1 | 107.9 |

Referring to Examples 11 through 16 and Comparatives I and J, polystyrene without lubricant, in Table V, the higher the viscosity of the acid salt lubrication material the more internal its performance was in high impact polystyrene. The output increased with the viscosity of the acid salt, the material of Example 10, at 1 part per hundred of polystyrene. The acid salt, the material of Example 8, had an equivalent output of the virgin resin. The salt material of Example 6 over-lubricated the system at 1 part per hundred of polystyrene. This is particularly evident at the extruder speed of 15 rpm. In other words, the acid salt of the material of Example 6 was more external lubricating than that of the material of Examples 8 and 10. This shows that as the viscosity increased, the tendency towards process compatibility or internal functionality increased.

EXAMPLES 17-28

Table VI below shows a comparison (Comparative K) of high impact polystyrene USS 610 without lubricant, compared with Comparatives L, M, and N using a zinc stearate lubricant. Additionally, Comparatives O and P were run using ethylene acrylic acid copolymer B from Table I, and Comparatives Q and R were run using copolymer A from Table I. Examples 17 through 28 illustrate the present invention on a similar concentration basis to that as in Comparatives L through N. The Comparatives and Examples were conducted in a Brabender Mixing Bowl. It has been found that blends having a fusion time of about 45 seconds or longer in the Brabender Mixing Bowl overlubricate when processed through an extruder. Fusion time limits for different equipment can be determined as desired.

As discussed above, it is desirable to lubricate the polystyrene polymer while minimizing fusion time. This is important to reduce the time the polymer is in the extruder and exposed to heat. At the same time, the frictional heat generation within the polymer is reduced.

Conventionally, zinc stearate is one of the most popular lubricants used commercially in the plastics area. It is usually used at 0.5 parts per hundred level or less in a system.

Zinc stearate lubricates in an external manner in polystyrene. The lubricant essentially functions at the surface of the resin during the extrusion process. Oppositely, an internal lubricant mixes internally with the resin and is dispersed throughout. This intimate mixture of the lubricant and resin is considered process compatibility. A certain degree of external functionality exists with internal lubricants, due to the mix of lubricant and resin near the barrel of the extruder.

Table VI illustrates the fusion times for high impact polystyrene USS 610 using a variety of comparative materials and materials from Examples 7, 8, 5 and 6 of the present invention.

TABLE VI

|  | Materials | Pph Lubr. in USS 610 | Fusion Time (Sec) |
|---|---|---|---|
| Comparative K | — | 0 | — |
| Comparative L | ZnSt | .1 | 12 |
| Comparative M | ZnSt | .5 | 30 |
| Comparative N | ZnSt | 1.0 | 189 |
| Comparative O | B | .5 | 93 |
| Comparative P | B | 1.0 | 154 |
| Example 17 | Ex. 7 | .5 | 15 |
| Example 18 | Ex. 7 | 1.0 | 36 |
| Example 19 | Ex. 7 | 2.0 | 48 |
| Example 20 | Ex. 8 | .5 | 6 |
| Example 21 | Ex. 8 | 1.0 | 10.5 |
| Example 22 | Ex. 8 | 2.0 | 24 |
| Comparative Q | A | .5 | 72 |
| Comparative R | A | 1.0 | 165 |
| Example 23 | Ex. 5 | .5 | 27 |
| Example 24 | Ex. 5 | 1.0 | 39 |
| Example 25 | Ex. 5 | 2.0 | 43.5 |
| Example 26 | Ex. 6 | .5 | 24 |
| Example 27 | Ex. 6 | 1.0 | 42 |
| Example 28 | Ex. 6 | 2.0 | 57 |

Comparatives L through N show that zinc stearate behaves as a satisfactory lubricant up to 0.5 parts per hundred. At 1.0 part per hundred zinc stearate, over-lubrication occurs. This substantiates the fact that zinc stearate generally behaves as an external acting lubricant in high impact polystyrene.

Comparatives O and P using ethylene acrylic acid copolymer B of Table I over-lubricates the system and cannot be used effectively as a lubricant high impact polystyrene. Examples 17-19 show that the material of Example 7, ethylene acrylic acid copolymer B of Table I, neutralized to 25 percent with calcium hydroxide can be incorporated into the system up to 1 part per hundred. As shown in Example 19, at 2 parts per hundred of the material of Example 7 borders on over-lubrication. The material of Example 8, which is 50 percent neutralized ethylene acrylic acid copolymer B of Table I with calcium hydroxide, has a fusion time of 24 seconds at 2 parts per hundred level. This fusion time is less than that exhibited by 0.5 parts per hundred level of zinc stearate, indicating a more internal acting lubricant than zinc stearate. This confirms the previous evidence that the ethylene acrylic acid copolymer salts behave in an internal fashion in styrenic polymers.

Also included in Table VI are Comparatives Q and R and Examples 23 through 28 of the present invention. These examples show the lubrication behavior in high impact polystyrene with the copolymer salt of Examples 5 and 6 made from acrylic acid copolymer A of Table I. Examples 23 through 25 show that up to 2.0 pph of lubricant of the material of Example 5 can be used before over-lubrication occurs; and Examples 26 and 27 show that up to 1.0 pph of lubricant of the material of Example 6 can be used before over-lubrication occurs. In all cases of Examples 17 through 28, more lubricant of the present invention can be used than zinc 8 of Table IV. The measurement was the percent weight loss at the measured temperature.

TABLE VIII

| | Lubr. Mat'l | % Weight Loss | | | | | | | |
|---|---|---|---|---|---|---|---|---|---|
| | | 275° C. | 300° C. | 316° C. | 325° C. | 350° C. | 375° C. | 400° C. | 450° C. |
| Example 32 | Ex. 8 | 0.8 | 1.1 | 1.6 | 1.8 | 2.5 | 4.2 | 10.0 | 95.8 |
| Comparative V | B | 1.9 | 4.0 | 7.0 | 9.5 | 20.0 | 60.7 | 61.6 | 64.5 | stearate without over-lubrication.

Further evidence that the copolymer acid B of Table I salts behaves more internally in high impact polystyrene is that as more material from Example 8 is added to polystyrene, the melt index of the blend increases. This indicates that the assumption that this acid salt functions as a flow modifier is correct.

EXAMPLES 29-31

In the polymer lubrication art it is highly desirable to find a lubricant that could be used in a variety of polymers. Of particular interest is a lubricant that could be used in olefins as well as styrenics. Therefore, the internal behaving material of Example 8 was evaluated in polypropylene. The Brabender Mixing Bowl was run at 60 rpm, 180° C. with a 35 gram charge. The copolymer of ethylene acrylic acid has a chemical structure similar to olefins. It is expected, and there is a tendency for, a higher degree of chemical compatibility in the olefins than in the styrenics. Therefore, higher loading levels of the lubricant are possible. This is particularly shown in Table VII illustrating Examples 29-31 and Comparatives S, T and U.

TABLE VII

| | Material | Pph Polypropylene | Fusion time (Sec) |
|---|---|---|---|
| Comparative S | — | 0 | 9 |
| Comparative T | B | .5 | 15 |
| Comparative U | B | 1.0 | 18 |
| Example 29 | Ex. 8 | .5 | — |
| Example 30 | Ex. 8 | 1.0 | 9 |
| Example 31 | Ex. 8 | 2.0 | 9 |

As illustrated in Table VII in Example 31, 2 parts of the material of Ex. 8 has an equivalent fusion time as the virgin resin with no lubricant. This is indicative of internal functioning. Comparatives T and U show that material B, unneutralized ethylene acrylic acid, does not over-lubricate the system. However, as shown in Examples T and U, the fusion time increases upon the addition of material B as lubricant. This indicates that the lubricant material of Example 8 of the present invention behaves more internally than unneutralized ethylene acrylic acid copolymer. Therefore, the material of Example 8 performs as an internal lubricant in polypropylene, as well as high impact polystyrene.

EXAMPLE 32

The heat stability of the lubricants of the present invention was measured to determine up to what processing conditions could be used. High impact polystyrene is processed at temperatures about 200° C. (392° F.). Thermogravimetric analysis was conducted using the Du Pont 951 Thermogravimetric Analyzer. A 10° C./min heating rate with a 30 mg sample was conducted in air. The results are summarized as Example 32 and Comparative V in Table VIII. Copolymer acid B of Table I was run against the copolymer salt of Example 8 of Table IV. The measurement was the percent weight loss at the measured temperature.

These results show that the lubricant copolymer salt of Example 8 of the present invention has improved heat stability over the unneutralized copolymer acid. Further, copolymer salt of Example 8 has good heat stability at temperatures as high as 400° C.

Although the above examples were conducted with calcium hydroxide, it is understood that the copolymer salts of alpha-olefins and alpha,beta-ethylenically unsaturated carboxylic acids can be used as lubricants.

While exemplary embodiments of the invention have been described, the true scope of the invention is to be determined from the following claims:

What is claimed is:

1. A composition comprising:
   a polymer selected from the group consisting of: polyolefins; styrene based polymers; polyamides; polyesters; polycarbonates; polyvinyl chloride; copolymers of acrylonitrile, butadiene, styrene; and phenolic resins; and
   up to 10 parts per hundred of the polymer of a lubricant which comprises a copolymer salt of a copolymer of an alpha-olefin and an alpha,beta-ethylenically unsaturated carboxylic acid, the copolymer acid having a number average molecular weight between about 500 and about 5000, the copolymer acid having up to 100% of the carboxylic acid groups neutralized with at least one cation from the group consisting of metallic cations having a valence of 1 to 3.

2. The composition as recited in claim 1 wherein the polymer is selected from a group consisting of polypropylene and polystyrene.

3. The composition as recited in claims 1 or 21 wherein the alpha-olefin is ethylene.

4. The composition as recited in claim 2 wherein the cation is of a metal selected from the group consisting of Groups IA, IIA, IIIA and the transition elements of the Periodic Table of Elements.

5. The composition as recited in claim 4 wherein the cation is selected from the group consisting of sodium, potassium, magnesium, calcium, barium, zinc and aluminum.

6. The composition as recited in claim 5 wherein the cations are supplied in the form of cation containing material selected from the group consisting of metal: oxides, hydroxides, oxylates, acetates, bicarbonates, methoxides and nitrates.

7. The composition as recited in claim 6 wherein the cation containing materials are selected from the group consisting of sodium hydroxides, magnesium oxide, calcium hydroxide, calcium acetate, zinc acetate and aluminum hydroxide.

8. The composition as recited in claims 3, 27 or 30 wherein the alpha,beta-ethylenically unsaturated carboxylic acid has between 3 and 6 carbon atoms.

9. The composition as recited in claim 8 wherein the alpha,beta-ethylenically unsaturated carboxylic acid is acrylic acid.

10. The composition as recited in claim 9 wherein the copolymer is ethylene and acrylic acid having an acid number between about 40 and about 160.

11. The composition as recited in claim 10 wherein the copolymer of ethylene and acrylic acid is from about 15% to about 60% neutralized with the metal cation.

12. The composition as recited in claim 11 wherein the copolymer of ethylene and acrylic acid is from about 25% to about 60% neutralized with the metal cation.

13. The composition as recited in claim 11 wherein the cation is calcium.

14. The composition as recited in claim 13 wherein the cation containing material is calcium hydroxide.

15. The composition as recited in claim 9 wherein the viscosity of the copolymer salt is greater than about 800 cps.

16. The composition as recited in claim 9 wherein the molecular weight of the copolymer acid is from about 1,000 to about 3,500.

17. The composition as recited in claim 8 wherein the polymer is polystyrene and there is from 0.5 to 3.5 parts of the lubricant per 100 parts of polystyrene, the lubricant having a viscosity from about 8,000 cps to about 50,000 cps.

18. The composition as recited in claim 8 wherein the polymer is polystyrene and there is from about 0.5 to 2.0 parts of the lubricant per 100 parts of polystyrene, the lubricant having a viscosity of about 800 cps to about 8,000 cps and a Shore A2 hardness of from about 70 to about 100.

19. A method of processing polymers comprising the steps of:
feeding the polymer and a lubricant to a processing means, wherein the lubricant comprises a copolymer salt of a copolymer of an alpha-olefin and an alpha,beta-ethylenically unsaturated carboxylic acid, the copolymer acid having a molecular weight between about 500 and about 6,000, the copolymer acid being neutralized from 15 to 100% with at least one cation from the group consisting of metallic cations having a valence of 1 to 3; and
processing the polymer and the lubricants in the processing means.

20. The method as recited in claim 19 further comprising the step of preblending the polymer and lubricant prior to feeding to the processing means.

21. The method as recited in claim 19 wherein the polymer and lubricant are processed in a temperature in the range from the melting point of the polymer up to 400° C.

22. The process as recited in claim 19 wherein the alpha-olefin is ethylene.

23. The process as recited in claim 22 wherein the cation is of a metal selected from the group consisting of Groups IA, IIA, IIIA and the transition elements of the Periodic Table of Elements.

24. The process as recited in claim 23 wherein the cation is selected from the group consisting of sodium, potassium, magnesium calcium, barium, zinc and aluminum.

25. The process as recited in claim 24 wherein the cation containing materials are selected from the group consisting of sodium hydroxides, magnesium oxide, calcium hydroxide, calcium acetate, zinc acetate and aluminum hydroxide.

26. The process as recited in claims 19 or 23 wherein the alpha,beta-ethylenically unsaturated carboxylic acid has between 3 and 6 carbon atoms.

27. The process as recited in claim 26 wherein the alpha,beta-ethylenically unsaturated carboxylic acid is the copolymer of ethylene and acrylic acid having an acid number between about 1 and about 180.

28. The process as recited in claim 27 wherein the copolymer of ethylene and acrylic acid has an acid number between about 40 and about 160.

29. The process as recited in claim 28 wherein the cation is calcium.

30. The process as recited in claim 29 wherein the cation supplying material is calcium hydroxide.

31. The process as recited in claim 27 wherein the viscosity of the copolymer salt is greater than about 800 cps.

32. The process as recited in claim 27 wherein the polymer to be lubricated is selected from the group consisting of: polyolefins; styrene based polymers; polyamides; polyesters; polyvinyl chloride; copolymers of acrylonitrile, butadiene, and styrene; polycarbonates and phenolic resins.

33. The process as recited in claim 32 wherein the polymer is selected from a group consisting of polypropylene and polystyrene.

34. The process as recited in claim 27 wherein the molecular weight of the copolymer acid is from about 1,000 to about 6,000.

35. The process as recited in claim 34 wherein the molecular weight of the copolymer acid is from about 1,000 to about 3,500.

36. The process as recited in claim 27 wherein the copolymer acid is from 15% to 60% neutralized with the metal cation.

37. The process as recited in claim 36 wherein the copolymer acid is from 25% to 50% neutralized with the metal cation.

38. The composition as recited in claim 24 wherein there is from 0.5 to 10 parts per hundred of polymer of the lubricant.

39. The composition as recited in claim 38 wherein the viscosity of the copolymer salt is from 800 cps to 50,000 cps.

40. The composition as recited in claim 24 wherein the copolymer acid has from 15 to 100 percent of the carboxylic acid groups neutralized.

41. The composition as recited in claim 66 wherein the copolymer acid has from 15 to 60 percent of the carboxylic acid groups neutralized.

42. The composition as recited in claim 24 having a fusion time of less than 45 seconds.

43. A composition comprising:
a polymer selected from the group consisting of: polyolefins; styrene based polymers; polyamides; polyesters; polycarbonates; polyvinyl chloride; copolymers of acrylonitrile, butadiene, styrene; and phenolic resins; and
up to 10 parts per hundred of the polymer of a lubricant which comprises a copolymer salt of a copolymer of an alpha-olefin and an alpha,beta-ethylenically unsaturated carboxylic acid, the copolymer acid having a molecular weight between about 500 and about 6,000, the copolymer acid being neutralized having from 15 to 100% with at least one cation from the group consisting of metallic cations having a valence of 1 to 3.

* * * * *

UNITED STATES PATENT AND TRADEMARK OFFICE
CERTIFICATE OF CORRECTION

PATENT NO. : 4,412,040

DATED : October 25, 1983

INVENTOR(S) : Paul J. Albee, Jr., Patricia E. Burdick, and Joseph I. Wrozina

It is certified that error appears in the above-identified patent and that said Letters Patent are hereby corrected as shown below:

Col. 14, line 43, "claims 1 or 21" should read --claim 1-- line 63, "claims 3, 27, or 30" should read

--claims 3, 4, or 7--

Col. 16, line 39, "claim 24" should read --claim 1-- line 42, "claim 38" should read --claim 15-- line 45, "claim 24" should read --claim 1-- line 48, "claim 66" should read --claim 40-- line 51, "claim 24" should read --claim 1--

Signed and Sealed this

Third Day of April 1984

[SEAL]

Attest:

GERALD J. MOSSINGHOFF

Attesting Officer

Commissioner of Patents and Trademarks